Figures 1, 2:
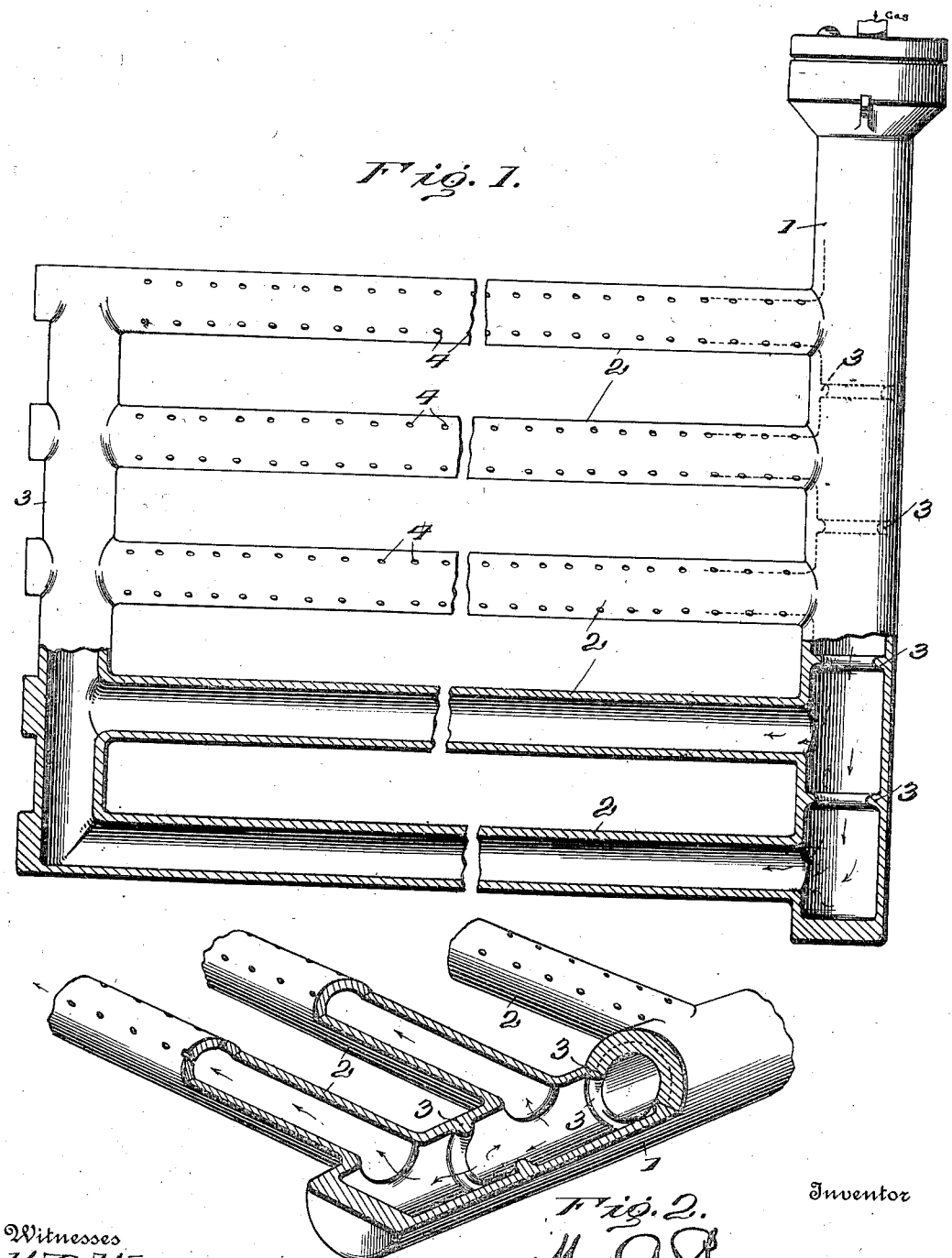

M. A. POSSONS.
GAS BURNER.
APPLICATION FILED FEB. 23, 1912.

1,032,860.

Patented July 16, 1912.

Witnesses
W. A. Williams
H. A. Pattison

Inventor
M. A. Possons,
By A. S. Pattison,
Attorney

UNITED STATES PATENT OFFICE.

MINARD A. POSSONS, OF CLEVELAND, OHIO, ASSIGNOR TO AMERICAN STOVE COMPANY, OF ST. LOUIS, MISSOURI, A CORPORATION OF NEW JERSEY.

GAS-BURNER.

1,032,860.

Specification of Letters Patent. Patented July 16, 1912.

Application filed February 23, 1912. Serial No. 679,344.

*To all whom it may concern:*

Be it known that I, MINARD A. POSSONS, a citizen of the United States, residing at Cleveland, in the county of Cuyahoga and State of Ohio, have invented certain new and useful Improvements in Gas-Burners, of which the following is a specification, reference being had therein to the accompanying drawing.

This invention relates to improvements in gas burners, and is more particularly intended for use as a broiler burner.

The object of my present invention is to provide means for equalizing the delivery of the gas to each burner tube so that the pressure on the flames from each burner tube is practically equal.

In the accompanying drawings—Figure 1 is a top plan view, partly in section of a burner embodying my invention. Fig. 2 is a detached perspective view of a portion of the burner, it being also shown partly in section.

This burner comprises a mixing or feeding tube 1, from which extend a plurality of burner tubes 2. One end of these burner tubes is in communication with the mixing tube 1 and the other ends of these tubes are connected by a cross-tube 3.

As is well understood by those skilled in this art, a broiler burner has the flame-openings 4 on the under side thereof, so that the flames are directed downwardly.

My present improvement consists in providing the mixing tube 1 with baffle-ridges or projections 3, which serve to intercept the flow of gas and to direct it laterally into the tube located between the baffle-ridges and the inlet end of the mixing tube. By reference to the drawings it will be observed that there is a baffle-projection 3 between each pair, or each two burner tubes 2, which location effects the result above stated. The equalization of pressure and flame in the burner tubes is further assisted by the cross-tube 3, which connects the ends of the burner tubes that are located away from the mixing tube 1.

The baffle ridges 3 are annular and extend entirely around the inner circumference of the mixing tube 1, thus forming annular interior baffle-ridges for the mixing tube.

Having thus described my invention, what I claim and desire to secure by Letters Patent is:

1. An improved gas burner, comprising a mixing tube, a plurality of burner tubes extending therefrom, the burner tubes and mixing tube having communicating passages, the mixing tube having an internal annular transversely arranged baffle ridge located between the points of communication of each adjacent two of said burner tube passages with said mixing tube passage, for the purpose described.

2. An improved burner, comprising a mixing tube, a plurality of burner tubes projecting therefrom and communicating therewith, the mixing tube having an internal baffle ridge between the communications of each two burner tubes with the mixing tube, and a cross tube establishing communication between the opposite ends of the burner tubes.

In testimony whereof I hereunto affix my signature in the presence of two witnesses.

MINARD A. POSSONS.

Witnesses:
 FRED T. BATCHELOR,
 E. A. SCHNEIDER.